United States Patent [19]

Semchena et al.

[11] Patent Number: 5,531,472
[45] Date of Patent: Jul. 2, 1996

[54] APPARATUS AND METHOD FOR CONTROLLING AN OCCUPANT RESTRAINT SYSTEM

[75] Inventors: John H. Semchena, Royal Oak; Ernest M. Faigle, Dryden; Richard J. Thompson, Imlay City; Joseph F. Mazur; Charles E. Steffens, Jr., both of Washington, all of Mich.

[73] Assignee: TRW Vehicle Safety Systems, Inc., Lyndhurst, Ohio

[21] Appl. No.: 431,570

[22] Filed: May 1, 1995

[51] Int. Cl.⁶ .................................................. B60R 21/16
[52] U.S. Cl. ........................ 280/735; 307/10.1; 348/148
[58] Field of Search .................................. 280/735, 734, 280/728.1, 730.1, 739, 736; 180/272, 273; 307/10.1; 348/148, 143

[56] References Cited

U.S. PATENT DOCUMENTS 5,074,583  12/1991  Fujita et al. ............................ 280/735
5,232,243   8/1993  Blackburn et al. ..................... 280/735
5,330,226   7/1994  Gentry et al. .......................... 280/735

Primary Examiner—Margaret A. Focarino
Assistant Examiner—Peter C. English
Attorney, Agent, or Firm—Tarolli, Sundheim, Covell, Tummino & Szabo

[57] ABSTRACT

Apparatus and method for controlling an occupant restraint system in a vehicle (10) comprises storing in a ROM memory (220) a block of image data representative of a viewing field within the vehicle (10). The viewing field includes an unoccupied vehicle seat (18) located in the occupant compartment (12) of the vehicle. A new block of image data is obtained which is representative of the viewing field with an occupant (202) on the seat (18). This image data is obtained with an image sensor (200), such as a CCD sensor, mounted in the vehicle (10) for viewing the field. The new block of image data is compared with the stored block of image data by a controller (30) to obtain the occupant's size and/or position in the vehicle. The controller (30) provides a control signal having a value which is a function of the comparison. A restraint regulator (120), such as a vent valve, responds to the control signal for controlling the occupant restraint system.

29 Claims, 4 Drawing Sheets

APPARATUS AND METHOD FOR CONTROLLING AN OCCUPANT RESTRAINT SYSTEM

TECHNICAL FIELD

The present invention is directed to apparatus and method for controlling an occupant restraint system in a vehicle.

BACKGROUND OF THE INVENTION

Occupant restraint systems for use in vehicles are well known in the art. One such restraint system includes a crash sensor, an inflatable air bag, and an actuation circuit that controls deployment of an air bag in response to an output signal from the crash sensor. The crash sensor may be an accelerometer that provides an electrical output signal having a value functionally related to the vehicle's deceleration. A controller evaluates the electrical output signal and provides an actuation signal when it determines a crash condition is occurring of such nature that the air bag should be deployed. An actuation circuit includes a squib operatively connected to a source of inflation fluid.

In response to an actuation signal from the controller, the actuation circuit applies a current through the squib which causes the squib to ignite. When the squib ignites, the source of inflation fluid discharges gas into the air bag. This results in inflation of the air bag.

The art has recognized that it is not always desirable to inflate the air bag with 100% of the gas provided from the source of inflation fluid. One proposed system, disclosed in U.S. Pat. No. 5,232,243 to Blackburn et al. and assigned to the assignee of the present invention, controls the amount of gas that inflates the air bag in response to the detected weight of the occupant. Another system, disclosed in U.S. Pat. No. 5,330,226 to Gentry et al. and assigned to the assignee of the present invention, controls the amount of gas that inflates the air bag in response to detected occupant position.

U.S. Pat. No. 5,074,583 to Fujita et al. proposes a system employing several sensors for determining occupant presence, location, and size (including height and weight) for controlling an air bag system.

None of the systems noted above determine occupant size or position based on employing an image sensor for viewing a field including a passenger seat with an occupant thereon and providing a block of image data representative thereof for comparison with a prestored block of image data representative of the same field with an unoccupied passenger seat. Such a comparison is employed in accordance with the present invention for controlling an occupant restraint system.

SUMMARY OF THE INVENTION

In accordance with one aspect of the present invention, an apparatus is provided for controlling an occupant restraint system in a vehicle having a seat. A memory stores a block of image data which is representative of a viewing field within the vehicle and in which the field includes the seat when unoccupied. An image sensor is mounted in the vehicle and views the field including the seat with an occupant on the seat and provides a new block of image data. A controller includes a comparator that compares the new block of image data with the stored block of image data and provides a control signal having a value based on the comparison. A restraint regulator responds to the control signal for controlling the occupant restraint system based on the control signal.

In accordance with another aspect of the present invention, a method is provided for controlling an occupant restraint system in a vehicle having a seat. The method includes the steps of storing a block of image data representative of a viewing field within the vehicle which includes the vehicle seat when unoccupied. An image sensor is employed for viewing the field including the seat with an occupant on the seat for providing a new block of image data. The new block of image data is compared with the stored block of image data and a control signal is provided having a value based upon the comparison. A restraint regulating means controls the occupant restraint system in accordance with the control signal.

BRIEF DESCRIPTION OF THE DRAWINGS

Other features and advantages of the present invention will become apparent to those skilled in the art to which the present invention relates from a reading of the following detailed description of a preferred embodiment with reference to the accompanying drawings, in which.

DESCRIPTION OF PREFERRED EMBODIMENTS

Figure 1:
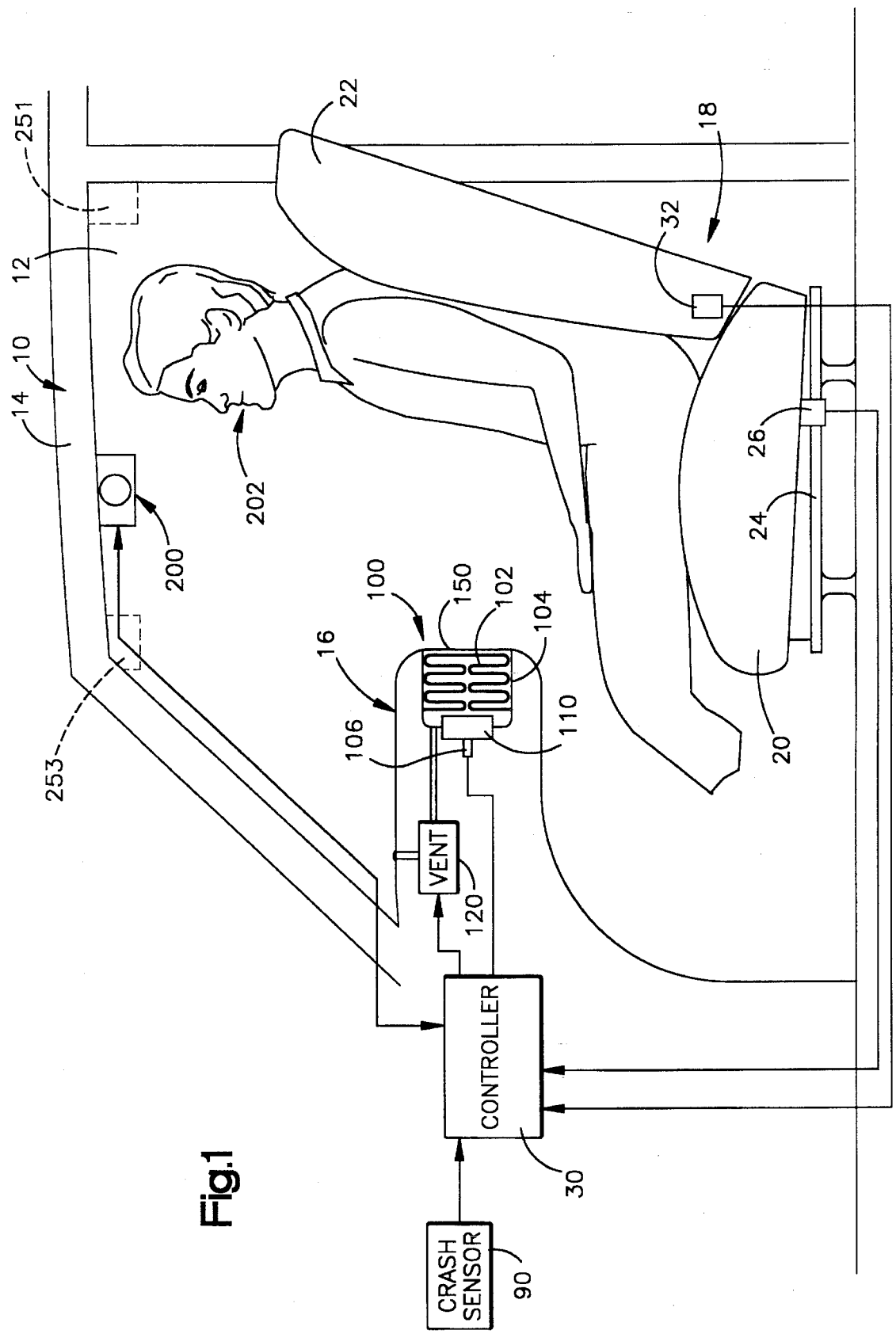
FIG. 1 is a schematic illustration of an occupant restraint system in a vehicle and constructed in accordance with the present invention.

Reference is now made to the drawings for illustration of the preferred embodiment of the invention only and not for purposes of limiting the invention. FIG. 1 illustrates a motor vehicle 10 having a passenger compartment 12 surrounded by a door frame 14. The passenger compartment 12 includes a dashboard or instrument panel 16 and a seat 18. The seat 18 has a seat cushion 20 and a seat back 22. The seat 18 has a plurality of positions relative to the dashboard 16, including a plurality of horizontal positions of the horizontally extending seat cushion 20 along a track 24. These seat cushion positions are measured with a suitable seat cushion position sensor 26 which provides electrical signals, representative of each of a plurality of positions, to a controller 30. A seat back angle position sensor 32 is operatively connected between the seat cushion 20 and the seat back 22. Sensor 32 provides electrical signals to the controller 30 representative of each of a plurality of different seat back inclination positions relative to the seat cushion 20. Sensors 26 and 32 may take various forms, such as potentiometers. The significance of the various seat back positions and the seat cushion positions will be discussed in greater detail below.

The vehicle 10 includes a vehicle crash sensor 90 which is suitably mounted to the vehicle and which is electrically connected to the controller 30. The crash sensor 90 may take any suitable form, such as an inertia switch. Preferably, the crash sensor 90 is an accelerometer of the type that outputs a crash condition signal having a characteristic indicative of a vehicle crash condition. The controller 30, in a known manner, analyzes the crash condition signal and determines if a deployment crash condition is occurring. A deployment crash condition is one in which deployment of an air bag is desired to enhance the restraining function of a restraint system for the occupant. A non-deployment crash condition is one in which deployment of an air bag is not desired. In such a non-deployment crash condition, seat belts alone may be sufficient to provide an adequate restraining function for the occupant.

The occupant restraint system includes an air bag assembly 100 having an air bag 102 operatively mounted in a housing 104 which, in turn, is mounted in the vehicle dashboard 16. A cover or air bag deployment door 150 overlies the air bag 102 and housing 104 and conceals them from the passenger compartment 12. The controller 30 is electrically connected to a squib 106 which, in turn, is operatively connected to an inflator 110. The inflator 110 is connected to the air bag 102 so that when the controller ignites the squib 106, inflation fluid, preferably an inert gas, is released from the inflator 110. The air bag 102 is then inflated past the air bag deployment door 150 into the passenger compartment.

An electrically controlled vent device 120, such as a valve, is operatively connected to the housing 104 and is electrically connected to the controller 30. The controller 30 controls the vent device 120 in order to control the pressure of the gas in the air bag 102. As will be brought out in greater detail hereinafter, the controller 30 controls the vent device 120 in response to signals obtained from an occupant size and position sensor 200. This sensor provides information to the controller 30 which is used to determine the size of the occupant and the position of the occupant relative to a reference point within the vehicle, such as the dashboard 16. This sensor and its relationship to the controller 30 will be described in greater detail below.

The inflator 110 provides a predetermined amount of gas, referred to herein as 100% of the possible gas. The controller 30 controls the vent device 120 to vent away a portion of the gas from the air bag 102. The vent device 120 takes the form of an electrically controlled regulator or valve that responds to a control signal provided by controller 30. The amount of inflation fluid that is directed away from the air bag 102 by the vent device 120 is determined by the extent to which the vent device 120 is opened in response to the control signal from the controller 30. Those skilled in the art will appreciate that controlling or regulating the amount of gas in the air bag 102 can be accomplished in other ways, such as by providing a plurality of sources of inflation fluid and controlling the number of sources actuated.

Figure 2:
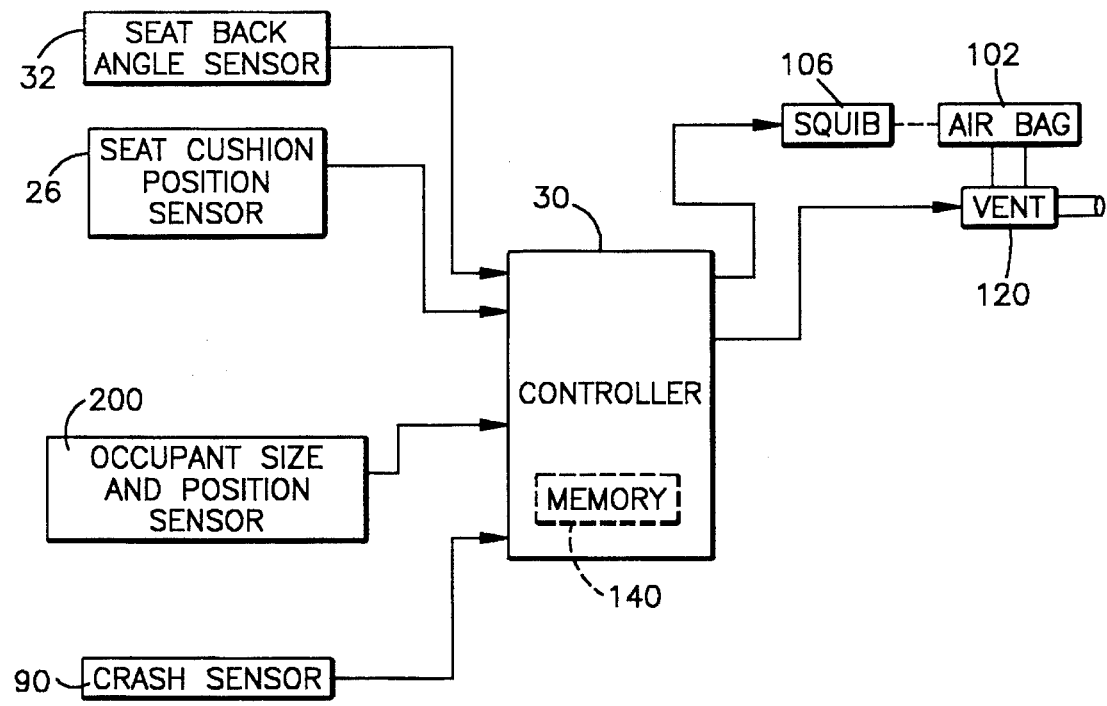
FIG. 2 is a schematic-block diagram illustration of the electrical control portion of the system illustrated in FIG. 1.
Figure 3:
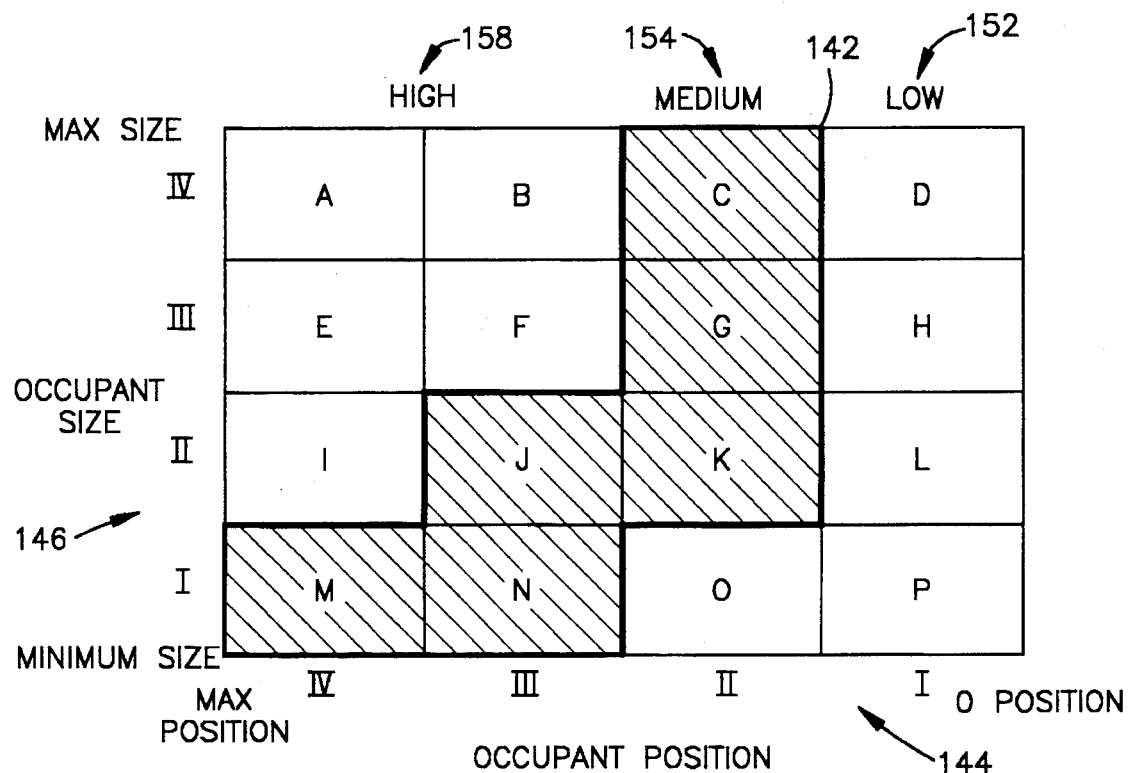
FIG. 3 is a schematic illustration of a look-up table employed by the controller of FIG. 1.

Referring now to FIGS. 2 and 3, the controller 30, which is preferably a microcomputer, includes a memory location 140 for storing a look-up table 142. The look-up table is divided into a plurality of occupant position ranges 144 and a plurality of occupant size ranges 146. For the purposes of discussion, the distance between the air bag deployment door 150 of the air bag assembly 100 and the seat 18, when it is in its rearwardmost upright location, i.e, the maximum distance, is divided into four ranges. If the occupant is in a position between a zero distance, i.e., against the air bag deployment door 150 of the air bag assembly 100, and about 10% of the maximum distance, the occupant is in position range I. When the occupant is in a position greater than about 10% and not more than about 30% of the maximum distance from air bag deployment door 150, the occupant is in position range II. When the occupant is in a position greater than about 30% and not more than about 60% of the maximum distance from air bag deployment door 150, the occupant is in position range III. When the occupant is in a position greater than about 60% of the maximum anticipated distance from the air bag deployment door 150, the occupant is in occupant position range IV.

The occupant size is divided, for the purposes of discussion, into four size ranges between a minimum size and a maximum size. When an occupant's size is between the minimum size and about 25% of the maximum size, the occupant's size is in occupant size range I. When the occupant's size is greater than about 25% and not more than about 50% of the maximum size, the occupant's size is in occupant size range II. When the occupant's size is greater than about 50% and not more than about 75% of the maximum size, the occupant's size is in occupant size range III. When the occupant's size is greater than about 75% of the maximum size, the occupant's size is in occupant size range IV.

The four occupant size ranges and position ranges form a 4×4 matrix that provides 16 occupant characterization blocks labelled A–P. These 16 occupant characterization blocks are grouped into three control zones. Blocks D, H, L, P, and O are designated as a low control zone 152. Blocks C, G, J, K. M, and N are designated as a medium control zone 154. Blocks A, B, E, F, and I are designated as a high control zone 158. The control zones 152, 154, 158 are used by the controller 30 to control the vent device 120.

The control zones are based upon the amount of pressure needed in the air bag 102 to restrain the occupant by dissipating the occupant's kinetic energy during a crash event and upon the amount of distance available for the bag 102 to stop the occupant's forward motion before the occupant strikes the dashboard 16. During a crash event, the occupant has a kinetic energy equal to $\frac{1}{2}mv^2$. M is the mass of the occupant, and v is the velocity at which the occupant is moving relative to the vehicle's interior. V is a function of the crash severity and requires a dynamic determination from the crash sensor output signal. The occupant's position and size can be continuously monitored to enable the vent device 120 to be adjusted prior to the occurrence of a crash event.

The work required to restrain an occupant during a crash event is equal to the occupant's kinetic energy. Work is defined as force times distance. Force is the force imparted by the restraint system, and distance is the distance over which the force can be imparted. The matrix of FIG. 3 considers both size and distance and establishes three separate air bag pressures. By selecting a desired air bag pressure based upon measurements and determinations made prior to the occurrence of a crash event, the vent device 120 is set in advance of a vehicle crash. The matrix approach permits simplicity in data manipulation to establish a control value.

When an occupant's size and position places the occupant in the low control zone 152, the vent device 120 is opened a first amount to vent a first amount of gas, such as approximately 50% of the possible gas. When an occupant's size and position places the occupant in the medium control zone 154, the vent device 120 is opened a second amount to vent a second amount of gas, such as approximately 25% of the possible gas. If an occupant's size and position places the occupant in the high control zone 158, the controller closes the vent device 120 so as not to vent any of the gas.

In accordance with the present invention, the sensor 200 provides image data to the controller 30 for use in determining the size of an occupant 202 located in seat 18, as well as for determining the position of the occupant 202. The occupant's size and position are used in combination with the look-up table 142 for controlling the vent device 120, as described above. In the description that follows, attention is specifically directed to the manner of providing and interpreting the image data obtained from sensor 200.

Figure 4:
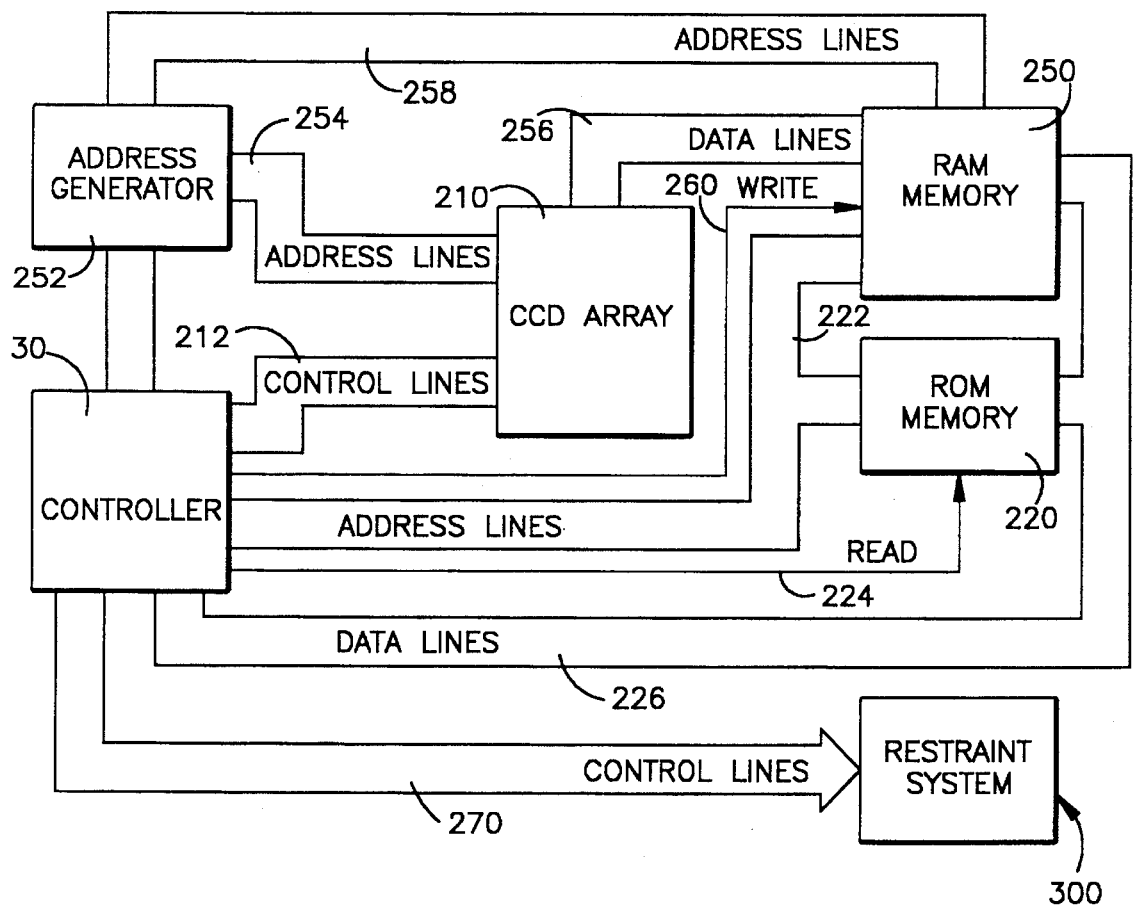
FIG. 4 is a schematic-block diagram illustration of the controller and associated circuitry for operating the image sensor in accordance with the present invention; and, FIG. 5 is a flow chart showing the control process in accordance with the present invention.

The image sensor 200 may take the form of a CCD (charge coupled device) image sensor such as sensor Model No. IK-M40A provided by Toshiba America C.P. Inc. This is a fixed lens camera which employs a ½" 420,000 pixel CCD image sensor having 460 lines of horizontal resolution. This is provided with a camera head that measures approximately 1½" in length and ⅝" in diameter and weighs approximately ½ ounce. The viewing image is two dimensional and is represented on the sensor by an array of pixels. The array may, for example, be 640 pixels wide (x axis image data) and 480 lines or pixels tall (y axis image data). For purposes of discussion herein, each pixel may be considered as a storage element having a charge or no charge (on or off). The array, referred to herein as the CCD array 210, is illustrated in FIG. 4 and is connected to the controller 30 by control lines 212. The pattern of on and off pixels represents the image being viewed by the sensor 200. This is a two dimensional view and, in the example being presented herein, is a side view of the passenger compartment 12. This includes a side view of the dashboard 16, the seat 18, including the seat cushion 20 and the seat back 22, and the occupant 202 sitting on the seat 18 as illustrated in FIG. 1. The sensor is suitably mounted in the vehicle, such as to the door frame 14 alongside the seat 18. Alternatively, the sensor may be mounted in an overhead location normally associated with an overhead dome light or forwardly thereof at a location normally associated with a map light. These sensors are located along the longitudinal center line of the vehicle. For example, a sensor 251 is drawn in dotted lines mounted behind the left shoulder of the passenger occupant 202 at the normal overhead dome light location. Another sensor 253 is shown in dotted lines at the normal map light location. Sensor 251 may be mounted inside a dome light assembly. Also, sensor 253 may be mounted inside a map light assembly. The sensor views the image field and provides image data, sometimes referred to as video data, representative of the viewed image. This data is obtained from the CCD array 210 under control of the controller 30.

Prior to being used with the occupant restraint system, the sensor 200, or a substitute sensor looking at the same viewing field as described above, serves to provide several blocks of data each representing a different position of the seat 18, when unoccupied. Assume, for example, there are ten horizontal seat cushion positions sensed by sensor 26 and ten seat back inclination positions sensed by sensor 32. This provides a total of 100 positions of seat 18 within the viewing field of sensor 200. Each of these seat positions is viewed to provide 100 blocks of image data. These blocks of data are stored in addressable locations in memory, such as a read-only memory or ROM memory 220 (see FIG. 4). The controller provides addresses for these blocks of image data from the signals provided by sensors 26 and 32. The controller 30 can access each of these blocks of data by providing an address to the ROM memory 220 by way of address lines 222. The controller 30 provides a READ signal on its read line 224 to read the image data stored at that address in the ROM memory 220. The data from the ROM memory is then provided over data lines 226 to the controller 30. The image data provided to the controller is compared with new image data, to be described below, for purposes of determining the size of the occupant 202 and the position of the occupant 202 with respect to a vehicle reference point, such as the air bag deployment door 150 on the dashboard 16.

The image sensor 200 views a viewing field that includes the seat 18 and any occupant sitting on the seat. The image in the viewing field is represented by the pattern of on or off pixels in the CCD array 210 as discussed above. The image is read from the CCD array 210 and supplied for temporary storage in a portion of a random access memory or RAM memory 250 (see FIG. 4). This RAM memory 250 preferably includes a portion known as a pixel memory having pixel locations corresponding with those in the CCD array 210. The controller 30 is employed for supplying READ control signals by way of control lines 212 to the CCD array to read the status of each pixel in the array. There are x axis addresses and y axis addresses. An address generator 252, under control of the controller 30, supplies x and y axis addresses by way of address lines 254 to the CCD array. A READ control signal is supplied by the control lines 212 to the CCD array. In response, the data at each of the x and y axis addresses of the CCD array is supplied by data lines 256 to the RAM memory 250 for temporary storage. This image data is stored at x and y axis addresses in the RAM memory 250 at the x and y axis addresses supplied over address lines 258 by the address generator 252. This image data is written into the RAM memory 250 when the controller 30 places a WRITE signal on line 260. The new image data obtained from the CCD array 210 is stored in a portion of RAM memory 250 referred to as a pixel memory. This new image data is available to the controller 30 for comparison with the prestored image data. As will be brought out in the discussion of the flow chart of FIG. 5, this comparison is employed for determining the size of the occupant 202 and the occupant's location relative to the air bag deployment door 150. The size and location information is then employed by the controller 30 for supplying control signals over control lines 270 for controlling a restraint system 300, which includes an air bag system 100 as described above. The system may also include an event recorder system for recording the occupant size and location information at the time of activating the air bag system 100.

Figure 5:
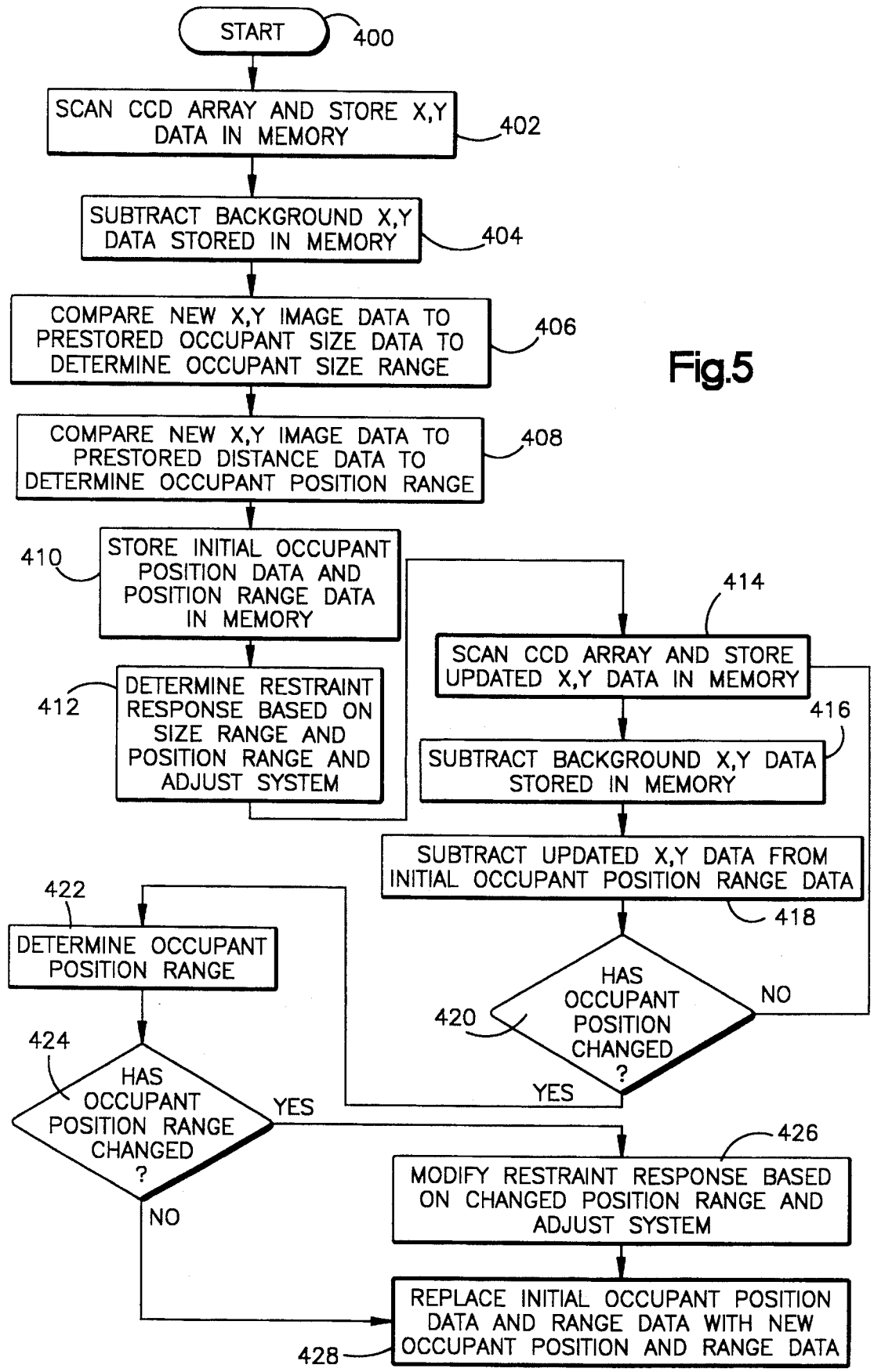

Reference is now made to FIG. 5 which illustrates a flow chart showing the manner in which the microcomputer in controller 30 is programmed in accordance with the present invention. The process begins with a start step 400 which occurs at power-up of the vehicle (i.e., when an ignition switch is turned on). In this step, all of the internal states of the controller 30 are set to predetermined initial values and the various sensors employed in the present invention are rendered operative. Consequently, the occupant size and position sensor 200 views an image in a viewing field within the occupant compartment 12 of the vehicle 10.

In accordance with step 402, the controller 30 is programmed to scan the CCD pixel array 210 (FIG. 4) to obtain from the CCD pixel array a block of new image data on data lines 256 with that image data representing a two dimensional x, y image. The new image data is stored in the pixel memory portion of the RAM memory 250, as discussed above, and is available to the controller 30 when the RAM memory 250 is addressed by the controller employing address lines 222.

In accordance with step 404, the controller 30 supplies an address to the ROM memory 220 to obtain from the ROM memory background x, y image data for the present seat position. The controller 30 knows the position of seat 18 from the signals provided by sensors 26 and 32 and provides the correct address over address lines 222 to obtain the image data representative of the unoccupied seat 18 in the present seat position. In step 404, this background image data of the unoccupied seat 18 is subtracted from the new image data of the occupied seat obtained from the pixel memory portion of the RAM memory 250. The resultant new x, y image data represents the profile of the occupant 202 and the distance of the occupant from the air bag deployment door 150.

In step 406, the new x, y image data obtained in step 404 is compared with prestored occupant size data to determine the occupant size range. The prestored data includes four ranges, which were referred to above with reference to FIG. 3 as size ranges I, II, III, and IV. As previously discussed, these four size ranges extend from a minimum size to a maximum size. The computer is programmed in accordance with step 406 to compare the new x, y image data with each of these four size ranges to determine whether the occupant's size falls within size range I, II, III, or IV. The maximum size may represent an image within the viewing field of a particular area.

When the new x, y image data defines an area that is between 0 and about 25% of this maximum area, the determined occupant size is within size range I. When the new x, y image data defines an area that is greater than about 25% but not more than about 50% of the maximum area, the determined occupant size is within size range II. When the new x, y image data defines an area that is greater than about 50% but not more than about 75% of the maximum area, the determined occupant size is within size range III. When the new x, y image data defines an area that is greater than about 75% of the maximum area, the determined occupant size is within size range IV.

In step 408, the new x, y image data from step 404 is compared with prestored distance data to determine the position of the occupant in the vehicle compartment 12. The prestored distance data is stored in the ROM memory 220 in addressable locations. The new x, y image data from step 404 represents the two dimensional image as shown in FIG. 1 which includes a side view of seat 18 with an occupant 202 on the seat. The occupant's position is determined, in step 408, based on the distance between the occupant and a reference point in the vehicle, such as the air bag deployment door 150, by comparing the newly acquired x, y image data from step 404 with the prestored distance data. That prestored distance data for any position of the seat 18 is stored in one of 100 addressable locations in the ROM memory 220.

In step 404, background x, y data is subtracted from new image data. The resultant new x, y image data represents the side profile of the occupant 202 and defines the distance between the occupant's chest and the air bag deployment door 150. This distance is at a maximum when the seat is adjusted to be in its most rearward position, with the seat back 22 inclined at the greatest angle relative to the horizontal seat cushion 20, and may fall within ranges I, II, III, and IV, as previously described with reference to FIG. 3. The four distance ranges are stored in the ROM memory 220. The controller 30 determines the occupant position range based on the distance determined from the new x, y image data. If the occupant's chest is at a distance from the air bag deployment door 150 which is not more than about 10% of the maximum distance, the occupant is considered to be in position range I. When the occupant's chest is at a distance from the air bag deployment door 150 greater than about 10% but not more than about 30% of the maximum distance, the occupant is in position range II. When the occupant's chest is at a distance from the air bag deployment door 150 greater than about 30% but not more than about 60% of the maximum distance, the occupant is in position range III. When the occupant's chest is at a distance from the air bag deployment door 150 greater than about 60% of the maximum distance, the occupant is in occupant position range IV.

In step 410, the initial x, y image data from step 404 and the determined occupant position range are stored in the RAM memory 250 so that they are available for use in the steps to be described below.

In step 412, a determination is made of the restraint response to be made based on the determined size range from step 406 and the determined position range from step 408. The restraint system is adjusted accordingly. The determination of the restraint response is made by comparing the determined occupant size range, such as size range III, and the determined occupant position range, such as position range III, with the look-up table 142 to determine which of the 16 occupant characterization blocks A through P applies. In the example presented, occupant position range III and occupant size range III results in application of characterization block F. Block F is located in the high control zone 158. The control zone information is employed by the controller 30 to provide the vent device 120 with a control signal having a value in accordance with the control zone information. The vent device 120 responds to the control signal by closing to prevent the venting of inflation fluid from the air bag so that a high air bag pressure will be provided in air bag 102. If the crash sensor 90 now senses a crash condition sufficient to deploy the air bag 102, the squib 106 is ignited and inflation fluid is released from the inflator 110 into the air bag. In accordance with the control signal from controller 30, the air bag is not vented so as to provide high air bag pressure.

Until the crash sensor 90 provides an output signal indicative of a vehicle crash condition, the controller continues to review the occupant position in order to modify the restraint response based on a changed occupant position range. Specifically, in step 414, the CCD array 210 is scanned for updated image data in the same manner as the CCD array is scanned in step 402. This updated x, y image data is stored in RAM memory 250.

In step 416, the procedure employed in step 404 is repeated for the updated image data. Thus, the image data stored in ROM 220 which is representative of the background x, y data of the seat 18 is subtracted from the updated x, y image data, This subtraction provides new x, y data that includes updated occupant position data representing the distance of the occupant's chest from the air bag deployment door 150.

In step 418, the updated x, y occupant position data obtained in step 416 is subtracted from the initial occupant position data stored in RAM memory 250 in step 410.

In step 420, a determination is made as to whether the occupant position data has changed. If the substraction process in step 418 indicates that there is a difference between the initial occupant position data and the updated occupant position data then the answer to this determination in step 420 is "yes"; otherwise, it is "no".

If the answer is "no", the controller continues to repeat steps 414, 416, 418 and 420 to determine whether the occupant position data has changed. If the answer is "yes" (i.e., the occupant position data has changed), a determination is made in accordance with step 422 of the occupant position range in the same manner as in step 408.

In step 424, a determination is made as to whether the occupant position range, as determined in step 422, has changed from the occupant position range previously determined in step 408. If so, the restraint response as determined and adjusted in step 412 is modified in step 426 based on the changed occupant position range. Otherwise, the procedure skips directly to step 428.

In step 428, the initial x, y occupant position data and position range data is replaced with the updated occupant position data and updated position range data.

The foregoing steps serve to monitor continuously the occupant's position range and make adjustments, as necessary, to the vent device 120 prior to the occurrence of a crash event, as sensed by the crash sensor 90.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, the following is claimed:

1. Apparatus for controlling an occupant restraint system in a vehicle having a seat, said apparatus comprising:
   memory means for storing a block of image data which is representative of a viewing field within said vehicle and in which said field includes said seat when unoccupied;
   image sensor means mounted in said vehicle for viewing said field including said seat with an occupant on said seat for providing a new block of image data;
   control means including comparing means for comparing said new block of image data with said stored block of image data and providing a control signal having a value based on said comparison; and
   restraint regulating means responsive to said control signal for controlling said occupant restraint system based on said control signal.

2. Apparatus as set forth in claim 1 wherein said memory means has a plurality of addressable storage locations each for storing a block of image data representative of one of a plurality of positions of said seat when unoccupied within said viewing field.

3. Apparatus as set forth in claim 2 including seat position sensor means for sensing in which one of said seat positions said seat is located within said vehicle and providing a seat position signal representative of said sensed one of said plurality of seat positions.

4. Apparatus as set forth in claim 3 wherein said control means includes means responsive to said seat position signal for addressing said memory means to obtain from said memory means a block of image data representative of said seat in a corresponding seat position.

5. Apparatus as set forth in claim 1 wherein said seat has an adjustable seat back having a plurality of different seat back positions, and said memory means has a plurality of addressable storage locations each for storing a block of image data representative of one of a plurality of said seat back positions of said seat back within said viewing field.

6. Apparatus as set forth in claim 5 including seat back position sensor means for sensing in which one of said plurality of seat back positions said seat back is located and providing a seat back position signal representative of said sensed one of said plurality of seat back positions.

7. Apparatus as set forth in claim 6 wherein said control means includes means responsive to said seat back position signal for addressing said memory means to obtain from said memory means a block of image data representative of said seat back in a corresponding seat back position.

8. Apparatus as set forth in claim 1 wherein said seat has an adjustable, generally horizontal seat cushion having a plurality of seat cushion positions and an adjustable seat back having a plurality of seat back positions and wherein said memory means has a first plurality of addressable storage locations each for storing a block of image data representative of one of said plurality of seat cushion positions within said viewing field and a second plurality of addressable storage locations each for storing a block of image data representative of one of said plurality of seat back positions within said viewing field.

9. Apparatus as set forth in claim 8 including seat cushion position sensor means for sensing in which one of said plurality of seat cushion positions the seat cushion is located and for providing a seat cushion position signal representative of said sensed one of said seat cushion positions and seat back sensor means for sensing in which one of said plurality of seat back positions said seat back is located and for providing a seat back position signal representative of said sensed one of said seat back positions.

10. Apparatus as set forth in claim 9 wherein said control means includes means responsive to said seat cushion position signal and to said seat back position signal for addressing said memory means to obtain from said memory means a block of image data representing said unoccupied seat in a corresponding seat cushion position and seat back position.

11. Apparatus as set forth in claim 1 wherein said image sensor means is located in said vehicle adjacent said seat so that said viewing field provides an image of said seat.

12. Apparatus as set forth in claim 1, wherein said image sensor means is located in said vehicle above said seat so that said viewing field provides an image of said seat from above thereof.

13. Apparatus as set forth in claim 12 wherein said sensor means is mounted within said vehicle at a location normally associated with an overhead light assembly.

14. Apparatus as set forth in claim 1, wherein said image sensor means is located within said vehicle above and in front of said seat so that said viewing field provides an image of said seat from in front thereof.

15. Apparatus as set forth in claim 14, wherein said sensor means is mounted within said vehicle at a location normally associated with an overhead map light assembly.

16. Apparatus as set forth in claim 1 wherein said image sensor means includes video camera means for viewing said viewing field.

17. Apparatus as set forth in claim 16 wherein said video camera means includes a charge coupled device (CCD).

18. Apparatus as set forth in claim 1 wherein said comparing means includes means for subtracting said stored block of image data from said new block of image data to provide new occupant image data representative of the size of an occupant in said vehicle.

19. Apparatus as set forth in claim 18 wherein said memory means includes a plurality of blocks of prestored occupant size range data representative of a plurality of size ranges of an occupant.

20. Apparatus as set forth in claim 19 including means for comparing said new occupant image data with said prestored occupant size range data to determine in which of the occupant size ranges said occupant falls.

21. Apparatus as set forth in claim 20 wherein said new occupant data is representative of occupant size and occupant distance from a vehicle reference point.

22. Apparatus as set forth in claim 21 wherein said memory means includes prestored occupant distance data representative of a plurality of occupant position ranges of distances of the occupant from said vehicle reference point.

23. Apparatus as set forth in claim 22 including means for comparing said new image data with said prestored occupant distance data to determine in which one of said occupant position ranges said occupant is located.

24. Apparatus as set forth in claim 23 including means for varying the value of said control signal based on the determined occupant size range and the determined occupant position range for controlling said occupant restraint system.

25. Apparatus as set forth in claim 24 including means for continuing the determination of the position of said occupant on said seat to determine whether said occupant is in a different occupant position range and means for varying the value of said control signal in accordance with said different occupant position range.

26. A method for controlling an occupant restraint system in a vehicle having a seat including the steps of:

storing a block of image data representative of said seat when unoccupied within a viewing field in said vehicle;

viewing said viewing field with an image sensor mounted in said vehicle when an occupant is located in said seat and providing a new block of image data;

comparing said new block of image data with said stored block of image data; and adjusting the occupant restraint system in accordance with said comparison.

27. A method as set forth in claim 26 wherein said comparing step includes the step of subtracting said stored block of image data from said new block of image data to provide new occupant data representative of occupant size.

28. A method as set forth in claim 27 including the steps of comparing said new occupant data with prestored occupant size data representative of a plurality of different size ranges of an occupant to determine the size range of said occupant and adjusting said restraint system in accordance with the determined occupant size range.

29. A method as set forth in claim 28 wherein said new occupant data represents both occupant size and occupant position relative to a vehicle reference point, and wherein said steps include comparing said occupant position relative to said vehicle reference point with prestored occupant position data representative of a plurality of different position ranges to determine in which position range the occupant in the seat falls and adjusting said restraint system in accordance with the determined occupant position range.

* * * * *